United States Patent
Dinh

(10) Patent No.: US 6,737,576 B1
(45) Date of Patent: May 18, 2004

(54) ELECTRICAL BOX ASSEMBLY

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/440,284

(22) Filed: May 16, 2003

(51) Int. Cl.⁷ .................................................. H02G 3/08
(52) U.S. Cl. ......................... 174/50; 174/53; 174/48; 174/57; 220/3.2; 220/3.3
(58) Field of Search ............................. 174/50, 53, 54, 174/57, 58, 61, 62, 63, 48; 220/3.2, 3.3, 4.01, 4.02, 3.8

(56) References Cited

U.S. PATENT DOCUMENTS

| | | |
|---|---|---|
| 2,510,745 A | 6/1950 | Kilgore |
| 2,514,745 A | 7/1950 | Dalzell |
| 2,757,817 A | 8/1956 | Egan |
| 3,701,451 A | 10/1972 | Schindler et al. |
| 3,917,899 A | 11/1975 | Oliver |
| 4,098,423 A | 7/1978 | Marrero |
| 4,109,095 A | 8/1978 | Kling et al. |
| 4,424,407 A | 1/1984 | Barbic |
| 4,443,654 A | 4/1984 | Flachbarth et al. |
| 4,505,403 A | 3/1985 | Bowden, Jr. et al. |
| 4,603,932 A | 8/1986 | Heverly |
| 4,605,817 A | 8/1986 | Lopez |
| 4,634,015 A | 1/1987 | Taylor |
| 4,803,307 A | 2/1989 | Shotey |
| 4,988,832 A | 1/1991 | Shotey |
| 5,012,043 A | 4/1991 | Seymour |
| 5,042,673 A | 8/1991 | McShane |
| 5,171,939 A | 12/1992 | Shotey |
| 5,434,359 A * | 7/1995 | Schnell ..................... 174/58 |
| 5,466,886 A | 11/1995 | Lengyel et al. |
| 5,683,005 A | 11/1997 | Mordick |
| 5,931,325 A | 8/1999 | Filipov |
| 5,967,354 A | 10/1999 | Whitehead et al. |
| 6,112,927 A | 9/2000 | Gretz |
| 6,172,298 B1 * | 1/2001 | Norvelle .................... 174/48 |
| 6,239,368 B1 * | 5/2001 | Gretz ........................ 174/57 |
| 6,346,674 B1 * | 2/2002 | Gretz ........................ 174/58 |

FOREIGN PATENT DOCUMENTS

CA 644330 7/1962

OTHER PUBLICATIONS

TayMac Corporation 2003 Catalog, pp. 1–14.

* cited by examiner

Primary Examiner—Dean Reichard
Assistant Examiner—Angel R. Estrada
(74) Attorney, Agent, or Firm—Hoffmann & Baron, LLP

(57) ABSTRACT

An electrical box assembly including a box having a base wall perimetrically bounded by a sidewall extending therefrom forming a housing adapted to receive an electrical component. The sidewall having an upper portion and a flange extending outwardly in a transverse direction from the upper portion. An electrical component attachment point is disposed adjacent the sidewall upper portion and adapted for securing an electrical component to the box. The flange is perimetrically bounded by a collar extending outwardly therefrom. A securement device disposed on the box for securing the box to a support structure is provided. A frame is further provided which is in telescopic engagement with the collar and movable relative thereto. The frame has an abutment surface for abutting against a facing surface. An adjustment device is provided for moving the frame relative to the box and urges the abutment surface against the facing surface.

28 Claims, 11 Drawing Sheets

ELECTRICAL BOX ASSEMBLY

FIELD OF INVENTION

The present invention relates to an electrical box assembly. More specifically, the present invention relates to a recessed electrical box assembly being adjustable in order to permit secure mounting.

BACKGROUND OF THE INVENTION

Electrical boxes provide a housing for electrical components such as outlets and switches when installed in the walls, ceilings or floors of buildings. Electrical boxes are typically secured to a support structure such as a wall stub and aligned with an opening in a covering material, such as wall board or siding. Boxes may be employed to house electrical components both in and out of doors.

Outdoor applications typically utilize electrical boxes which can resist contamination such as water and dirt created by exposure to the elements. Indoor applications such as in a bathroom or industrial setting may also subject an installed electrical component to contamination from cleaning fluid or other debris. Typical outlet boxes include a housing which holds the electrical component and a bracket having a flange which abuts the front face of the wall. In order to satisfy the requirements of such applications, electrical boxes also typically include a cover to shield the electrical components from contamination. Electrical box covers of the prior art may include openings therein to permit cords to extend there through, thereby allowing an electrical outlet to be used even when the cover is closed.

One such electrical box is disclosed in U.S. Pat. No. 4,988,832. This electrical box includes a recess configuration such that the electrical component is recessed from the front surface of the wall in which it is installed. The electrical box includes a housing attachable to a wall stud and a bracket securable thereto. The bracket has a flange which abuts against a wall surface and a base which aligns with the front face of an electrical component. Since the base must align with the electrical component, the housing must be precisely installed on the stud. If the housing is secured too far forward, then the bracket's flange will not seat properly against the wall surface allowing contamination to get between the cover and the wall. If the housing is mounted too far toward the back of the stud, a gap may exist between the base and the front of the electrical component, thereby compromising the function of the electrical box. There is no adjustability to accommodate for variation in the placement of the housing or the thickness of the wall covering.

Accordingly, it would be desirable to provide an electrical box which is useable both in and out of doors and can be properly secured and provides a degree of adjustability to accommodate the position of the box and the thickness of the covering material.

SUMMARY OF THE INVENTION

It is an advantage of the present invention to provide an electrical box assembly that may be used both in and out of doors.

It is another advantage of the present invention to provide an electrical box having an adjustable face frame to permit secure mounting.

It is a further advantage of the present invention to provide a recessed electrical box having an adjustment device for permitting the face frame to be adjusted.

In the efficient attainment of these and other advantages, the present invention provides an electrical box assembly including a box having a base wall perimetrically bounded by a sidewall extending therefrom forming a housing adapted to receive an electrical component. The sidewall has an upper portion and a flange extending outwardly in a transverse direction from the upper portion. An electrical component attachment point is disposed adjacent the sidewall upper portion and adapted for securing an electrical component to the box. The flange is perimetrically bounded by a collar extending outwardly therefrom. The invention further includes a securement device supported on the box for securing the box to a support structure. Also provided is a frame which is in telescopic engagement with the collar and movable relative thereto. The frame has an abutment surface for abutting against a facing surface. An adjustment device is provided for moving the frame relative to the box and urging the abutment surface against the facing surface.

The adjustment mechanism extends between the frame and the box and includes a pair of threaded members threadedly engaged with the flange.

The electrical box assembly further includes a cover pivotally secured to the frame by a hinge and is movable between an open and closed position. The hinge includes at least one clip for permitting the cover to be selectively removed and attached to the frame. The cover includes at least one slot formed therein which is adapted to permit a power cord to extend therethrough when the cover is in the closed position.

The present invention further provides a recessed electrical box assembly including a box having a base wall bounded by a sidewall extending therefrom forming a housing. The sidewall has an upper end forming a first opening. A flange extends outwardly in a transverse direction from the box upper portion, and the flange is bounded by a collar extending outwardly therefrom. The collar forms a second opening, the second opening being larger than the first opening. A frame is provided having a second sidewall forming a third opening. The second sidewall is adjustably positionable within the second opening. Further provided is an adjustment mechanism for moving the frame relative to the box, and the adjustment member extending between the frame and the flange.

DETAILED DESCRIPTION OF THE PREFERRED EMBODIMENT

Figure 1:
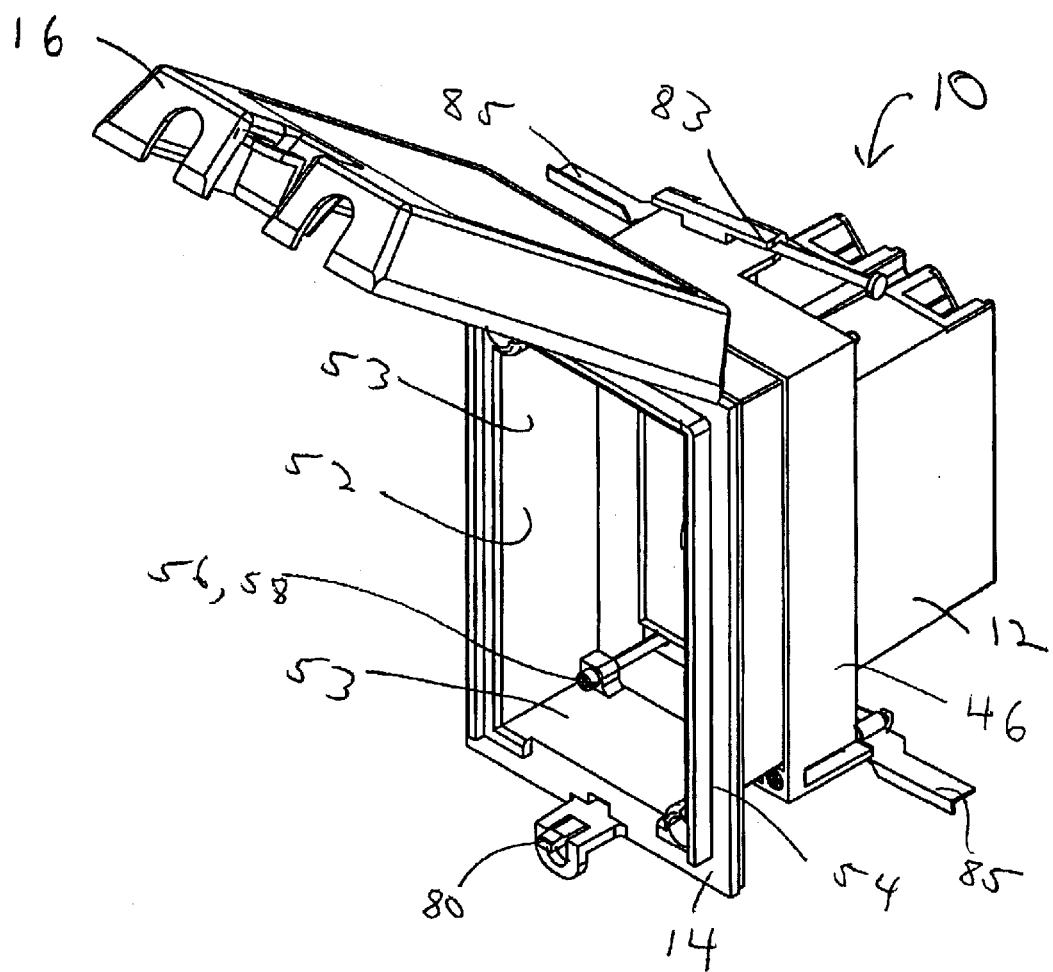
FIG. 1 is a top perspective view of the electrical box assembly of the present invention showing a cover in the open position.

The present invention is directed to an electrical box assembly which may be used either in or out of doors. The electrical box assembly may be employed to house an electrical component such as an outlet, switch or voice/data connector. The electrical component may be recessed such that the front face of the electrical component is offset from a front face of a facing surface, such as wall board, surrounding the electrical box. The present invention provides adjustability in order to permit a secure installation which assists in preventing contamination from intruding upon the installation site or on the electrical component housed inside the electrical box.

With reference to FIGS. 1–6, the present invention preferably includes a recessed electrical box assembly 10 having an electrical box 12, a face frame 14, and a cover 16. Electrical box 12 is adapted to secure an electrical component 18 such as a duplex outlet, switch or voice/data connector therein. Electrical component 18 may be covered with a standard face plate 20. Electrical box assembly 10 is positionable with an opening formed in a facing surface 24. A gasket 22 may be positioned on frame 14 in order to form a seal between frame 14 and a facing surface 24. Facing surface 24 may include material forming a wall such as sheetrock or plywood or any other material which may be used to form a covering surface on a floor, ceiling or wall.

Electrical box 12 includes a base wall 26 perimetrically bounded by a side wall 28 extending upwardly therefrom forming a housing adapted to receive electrical component 18. Side wall 28 may include a plurality of knock-outs 29 formed thereon to permit the passage of electrical wires into electrical box 12. Side wall 28 has an upper portion 30 that is perimetrically bounded by a flange 32 extending transversely therefrom. Electrical box upper portion 30 defines a box opening 34 which is adapted to accommodate electrical component 18. Electrical component mounting points 36 may be positioned adjacent box upper portion 30 and may include openings adapted to receive fasteners 38 for securing electrical component 18 to electrical box 12 in a manner well known in the art. Mounting points 36 are preferably disposed on opposed sidewall portions 28a and 28b thereby leaving the remainder of electrical box 12 open to provide clearance for electrical component 18 and any wires 40 which are connected thereto. After electrical component 18 is secured to box 12, face plate 20 may be secured to electrical component 18 in a manner well known in the art. Face plate 20 abuts flange 32 when secured to electrical component 18.

Electrical box 12 may further include a collar 46 perimetrically bounding and extending generally perpendicularly from flange 32. Collar 46 ends in a rim 48. In the preferred embodiment, collar 46 forms a generally rectangular-shaped opening 50 which is concentrically aligned with box opening 34. When electrical component 18 is secured within box 12, the electrical component 18 is recessed from rim 48. In the preferred embodiment, electrical box 12 may be formed of a plastic material, however, it is within the contemplation of the present invention that electrical box 12 may be formed of a variety of materials.

Electrical box 12 may be adjustably secured to frame 14. Frame 14 of the present invention preferably includes a wall member 52 which at one end includes a face flange 54 extending generally perpendicular therefrom. The other end of wall member 52 forms an opening 55 which provides access to electrical component 18 and cover plate 20. In the preferred embodiment, wall member 52 includes a plurality of wall segments 53 joined together forming a continuous generally rectangular-shaped structure. This shape corresponds to the generally rectangular shape of collar 46 and is sized to fit in a telescoping manner within the opening 50 formed by collar 46. The telescopic engagement between the rectangular collar 46 and frame 14 permits their relative translation but generally restricts relative rotation. Frame 14 may, therefore, be selectively moved in and out of the portion of outlet box 12 from flange 32 to collar rim 48. Such movement permits adjustment between frame 14 and electrical box 12 during installation.

Frame 14 is adjustably secured to outlet box 12 by way of an adjustment device 56. The securement of frame 14 to outlet box 12 is independent of electrical component 18 or its attachment points 36. Accordingly, frame 14 may be adjusted without impacting the securement of electrical component 18. In the preferred embodiment, adjustment device includes a pair of threaded fasteners 58. Fasteners 58 extend through apertures 60 formed in lugs 44 on frame 14 and are threadedly received within openings 62 formed in flange 32 of box 12. As threaded fasteners 58 are advanced, frame 14 is moved into electrical box 12. Wall member 46 may include indentations 47 running along its length at two of its corners in order to accommodate structures formed in outlet box 12 housing threaded members 90 which will be further described below.

Figure 5:
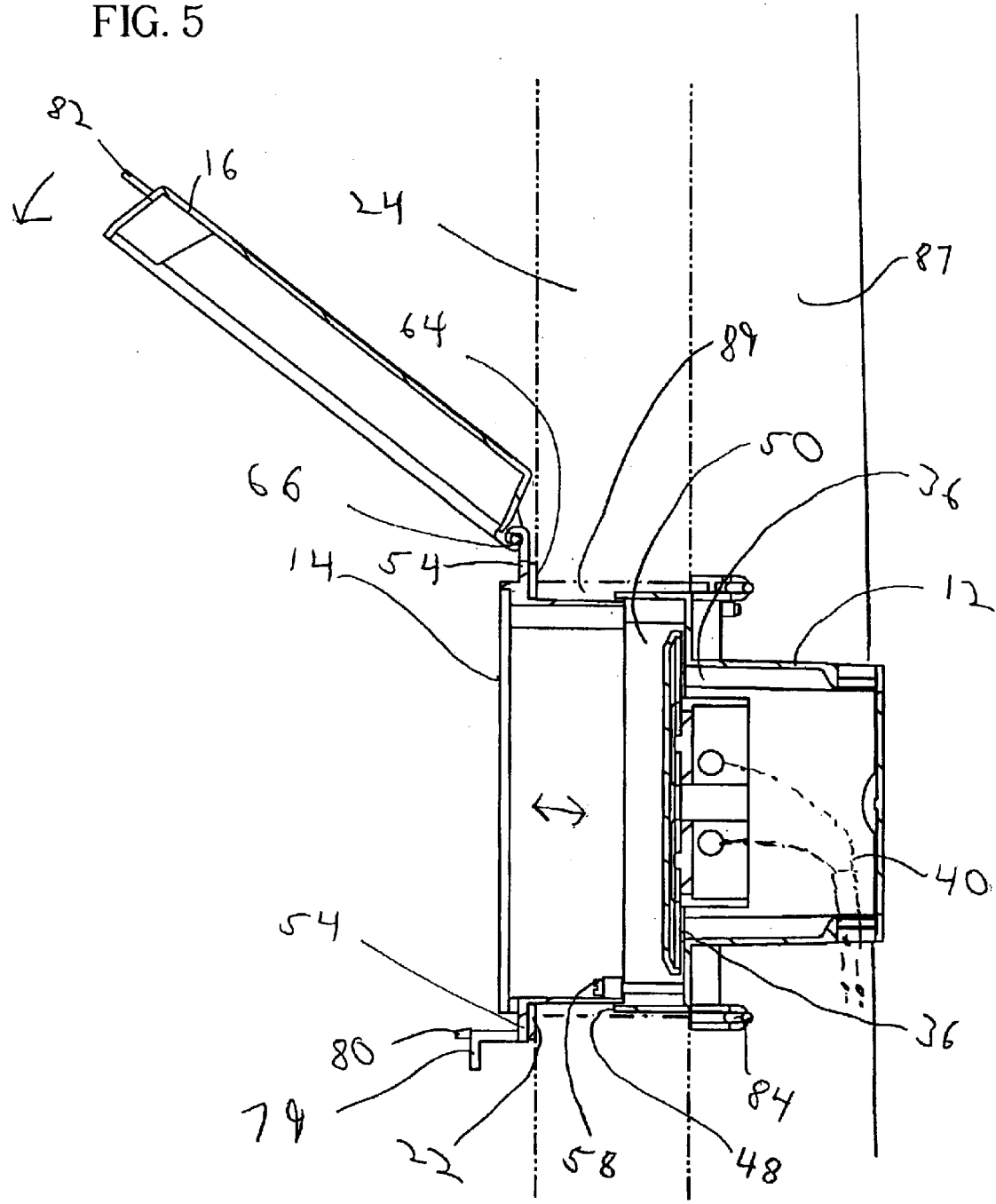
FIG. 5 is a cross-sectional elevational view of the outlet box of the present invention taken along line V—V of FIG. 4 showing the cover in the open position.
Figure 6:
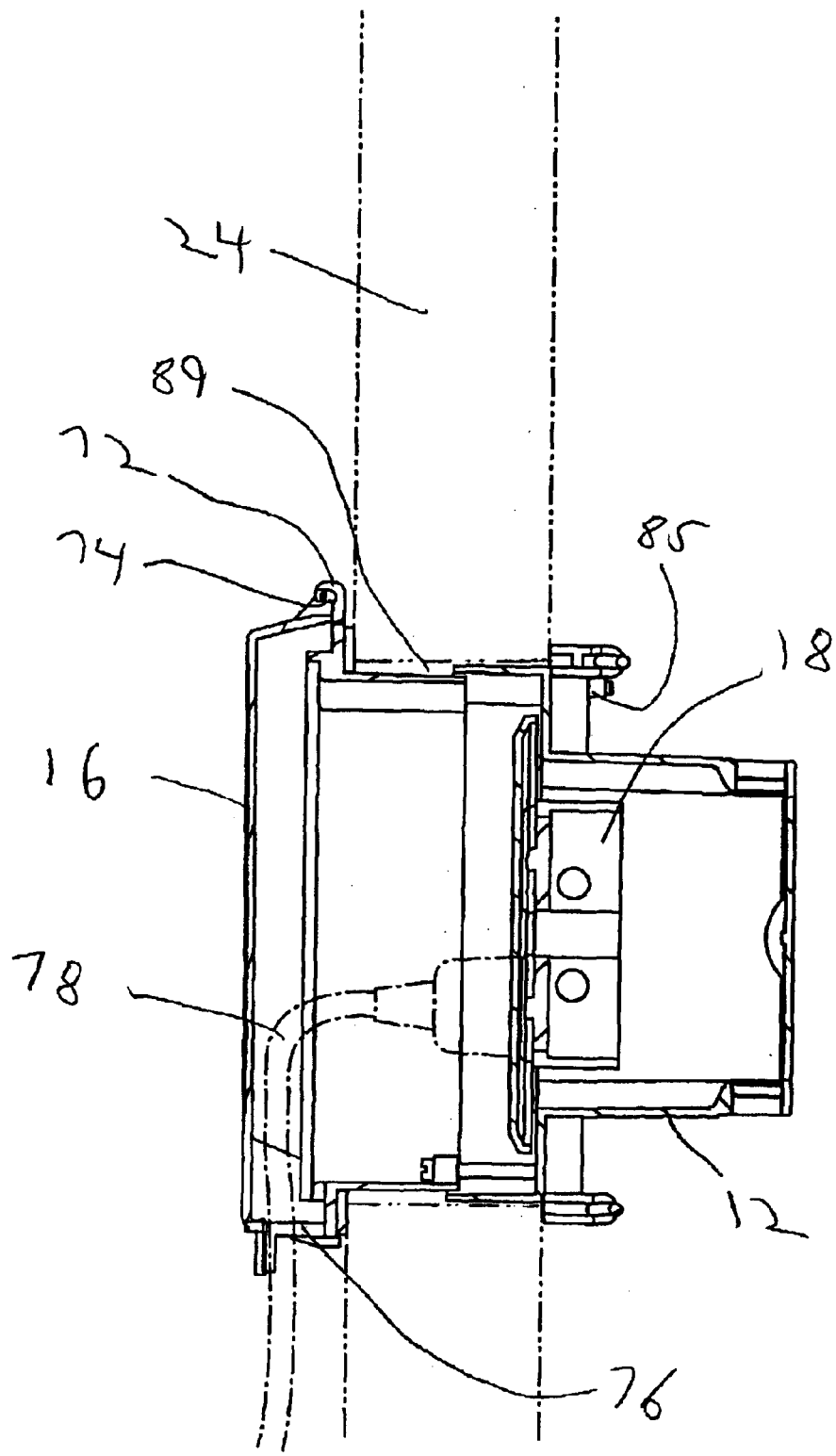
FIG. 6 is a cross-sectional view of the electrical box taken along line V—V of FIG. 4 showing the cover in the closed position.

Face flange 54 includes a rear surface 63 forming an abutment surface 64. Abutment surface 64 is adapted to abut against facing surface 24. Abutment surface 64 may include gasket 22 to form a seal between the facing surface 24 and frame 14, as shown in FIGS. 5 and 6. Gasket 22 may be formed of a resilient material to provide the desired sealing. Accordingly, fluid such as water or other contamination is prevented from getting behind face flange 54 and entering the opening formed in the facing surface 24 created to receive electrical box assembly 10. It is also within the contemplation of the present invention that gasket 22 may not be used in which case face flange rear surface 63 would form the abutment surface and directly contact facing surface 24.

The adjustability of frame 14 relative to electrical box 12 permits abutment surface 64 to be firmly positioned against facing surface 24 forming the desired seal. Variables such as the position of the electrical box on a support structure or the thickness of the facing surface can be accounted for due to the ability to move frame 14. The engagement of abutment surface 64 against facing surface 24 also aids in firmly securing electrical box assembly 10 in position. Furthermore, in the present invention, electrical component 18 is secured to electrical box 12 and covered with a face plate 20. Face plate 20 is independent of frame 14. Electrical component 18 and the manner in which it is secured is independent of adjustable frame 14. Accordingly, movement of frame 14 does not compromise the proper enclosure of electrical component 18 within electrical box 12.

Figure 2:
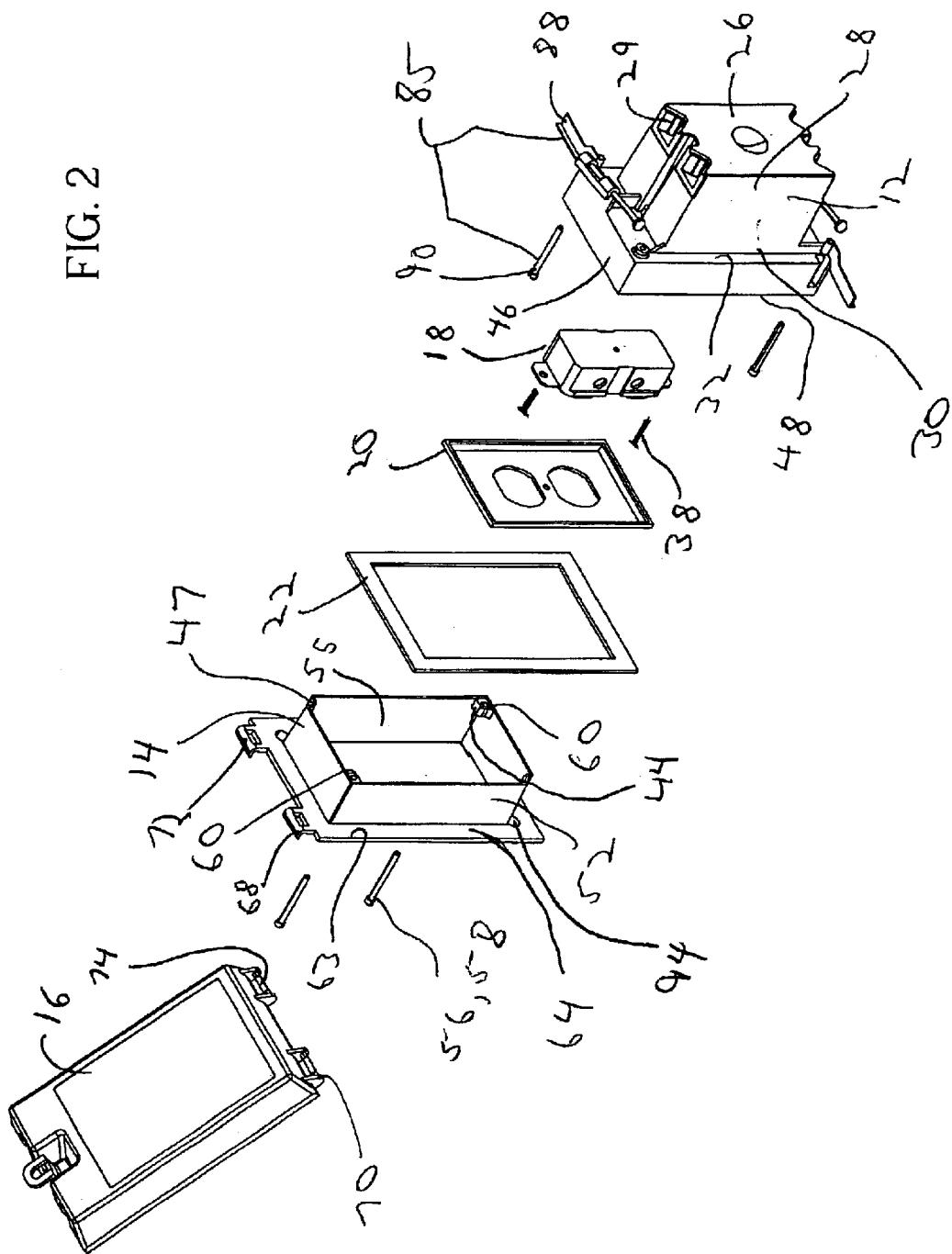
FIG. 2 is an exploded rear perspective view of the electrical box assembly of the present invention.
Figure 10:
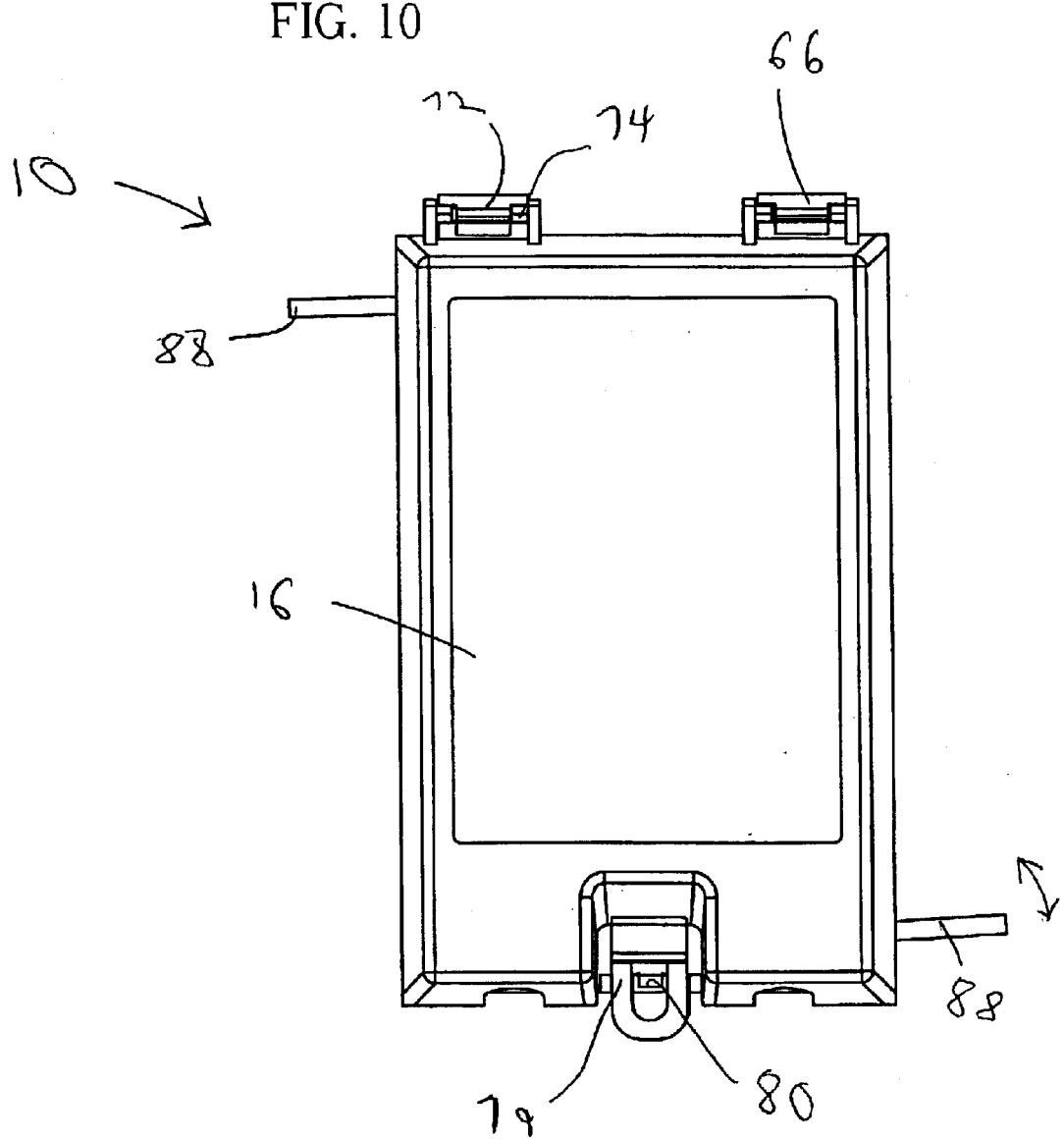
FIG. 10 is a front elevational view of the present invention showing the cover in the closed position.

The present invention may further include a cover 16 pivotally secured to face flange 54 by a hinge 66. With reference to FIGS. 2, 6 and 10, hinge 66 may be formed in a variety of manners well known in the art. In the preferred embodiment, face flange 54 may include a pair of first hinge members 68 which cooperate with a pair of second hinge members 70 disposed on cover 16. In the preferred embodiment, first hinge members 68 include a pair of U-shaped clips 72. Second hinge member 70 each include pins 74 located on cover 16. Clips 72 engage about pins 74. Pins 74 are releasably retained in the first hinge members by clips 72 thereby allowing cover 16 to be removed by a user. It is also within the contemplation of the present invention that the first hinge members may be located on the cover and the second hinge members may be located on the frame. Cover 16 is movable between a first open position (FIG. 5) to a second closed position (FIG. 6). When in the closed position, cover 16 prevents fluids, such as water, or other environmental elements from contaminating electrical components 18 secured to electrical box 12.

Figure 11:
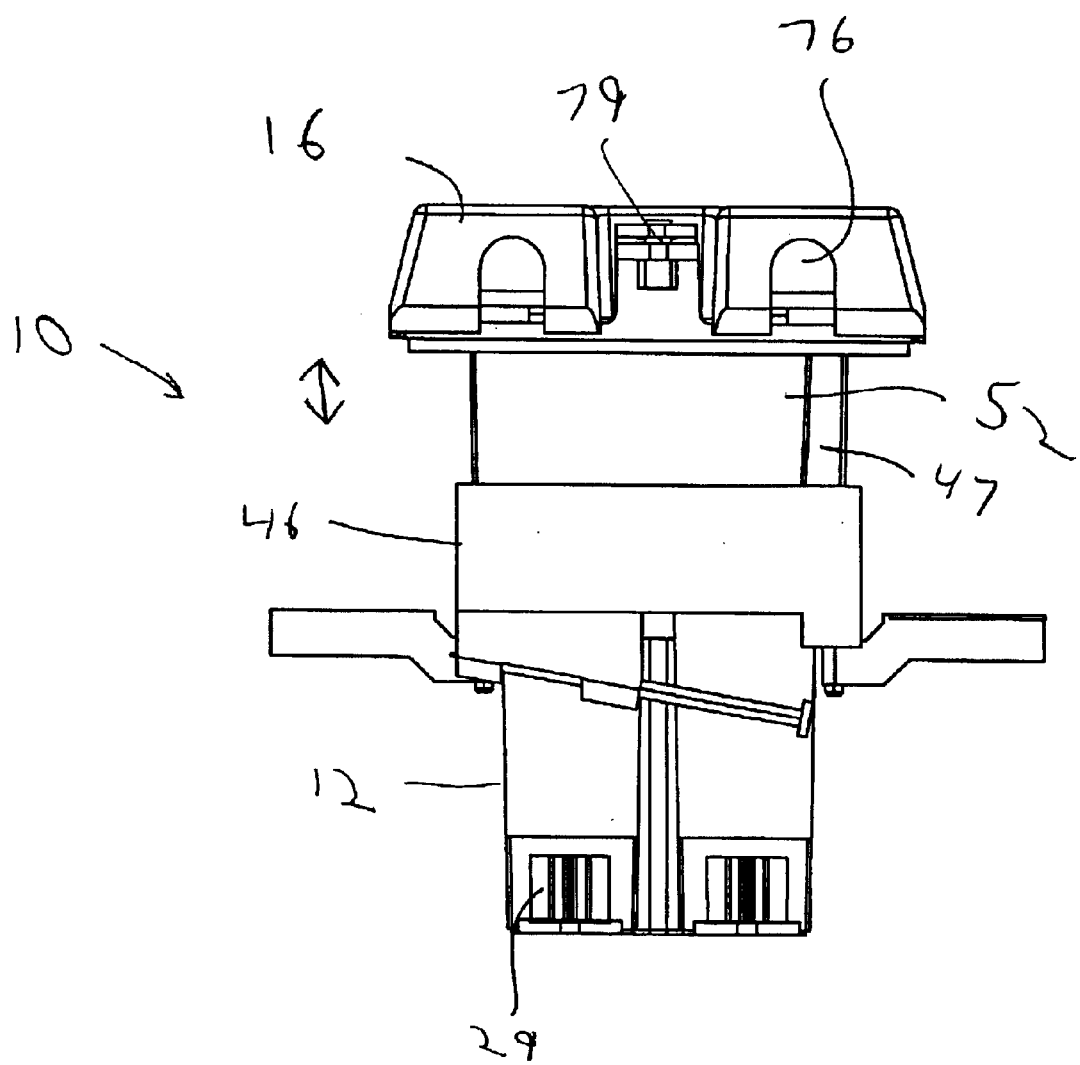
FIG. 11 is a bottom elevational view of the present invention.

Referring particularly to FIGS. 6 and 11, cover 16 may also include a pair of slots 76 located on the bottom edge thereof. Each slot 76 permits a power cord 78 (FIG. 6) to extend therethrough in the event that a power cord 78 is plugged into an outlet attached to electrical box 12. Slots 76 permit cover 16 to be maintained in the closed position while the plugs are secured in the electrical component 18 such as an outlet. Accordingly, protection from the elements is provided even when the electrical component 18 is in use.

Figure 3:
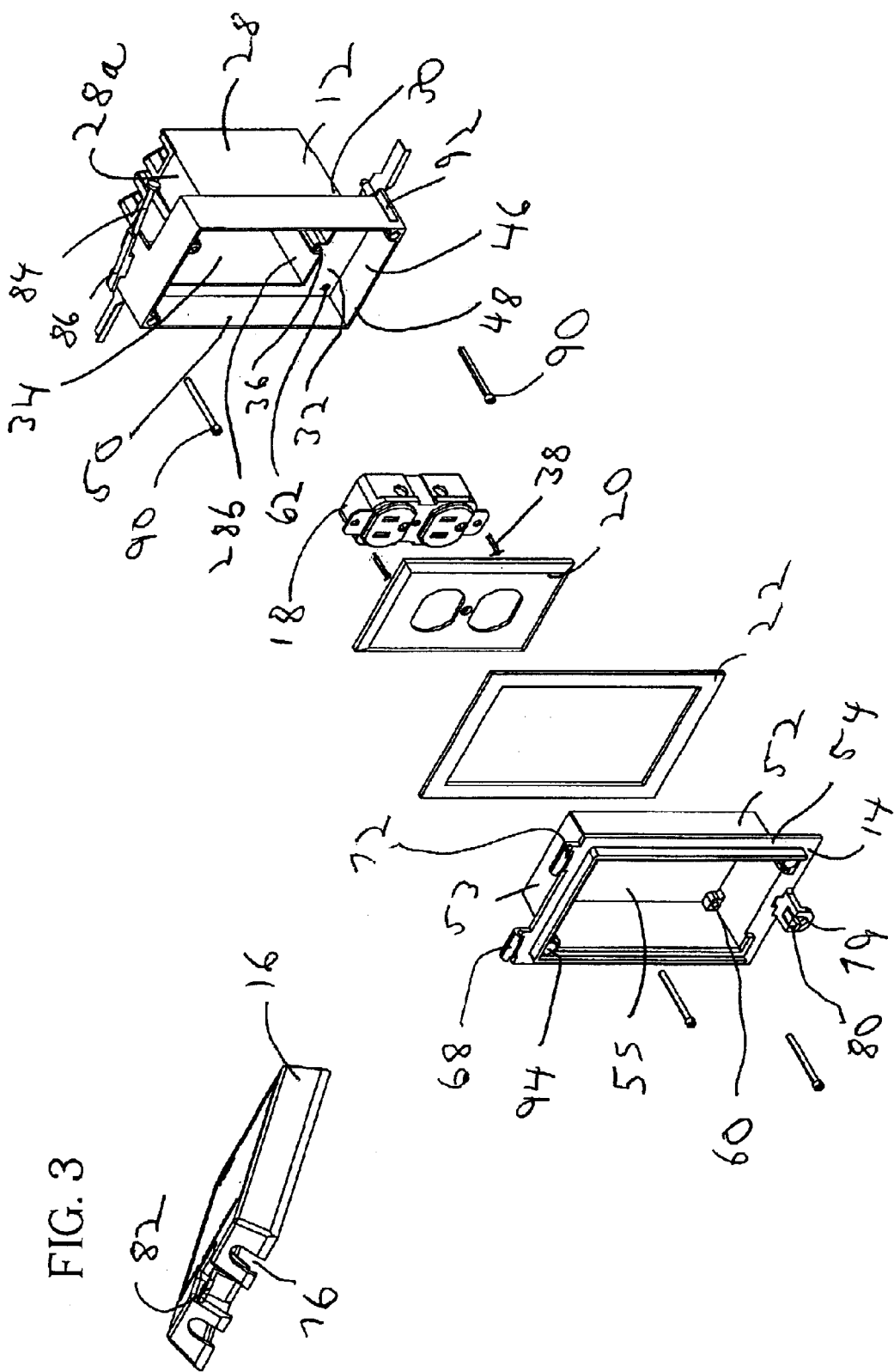
FIG. 3 is an exploded front perspective view of the electrical box of the present invention.

The present invention may also include a clasp 79 for retaining cover 16 in the closed position. Referring to FIGS. 3, 5 and 10, the clasp 79 may include a resilient member 80 extending from frame 14 and engageable with a clasp member 82 on cover 16. Deflection of resilient member 80 permits clasp member to be released and cover 16 to be moved into the open position. It is within the contemplation of the present invention that any number of latching mechanisms could be employed to maintain cover 16 in the closed position.

Figure 7:
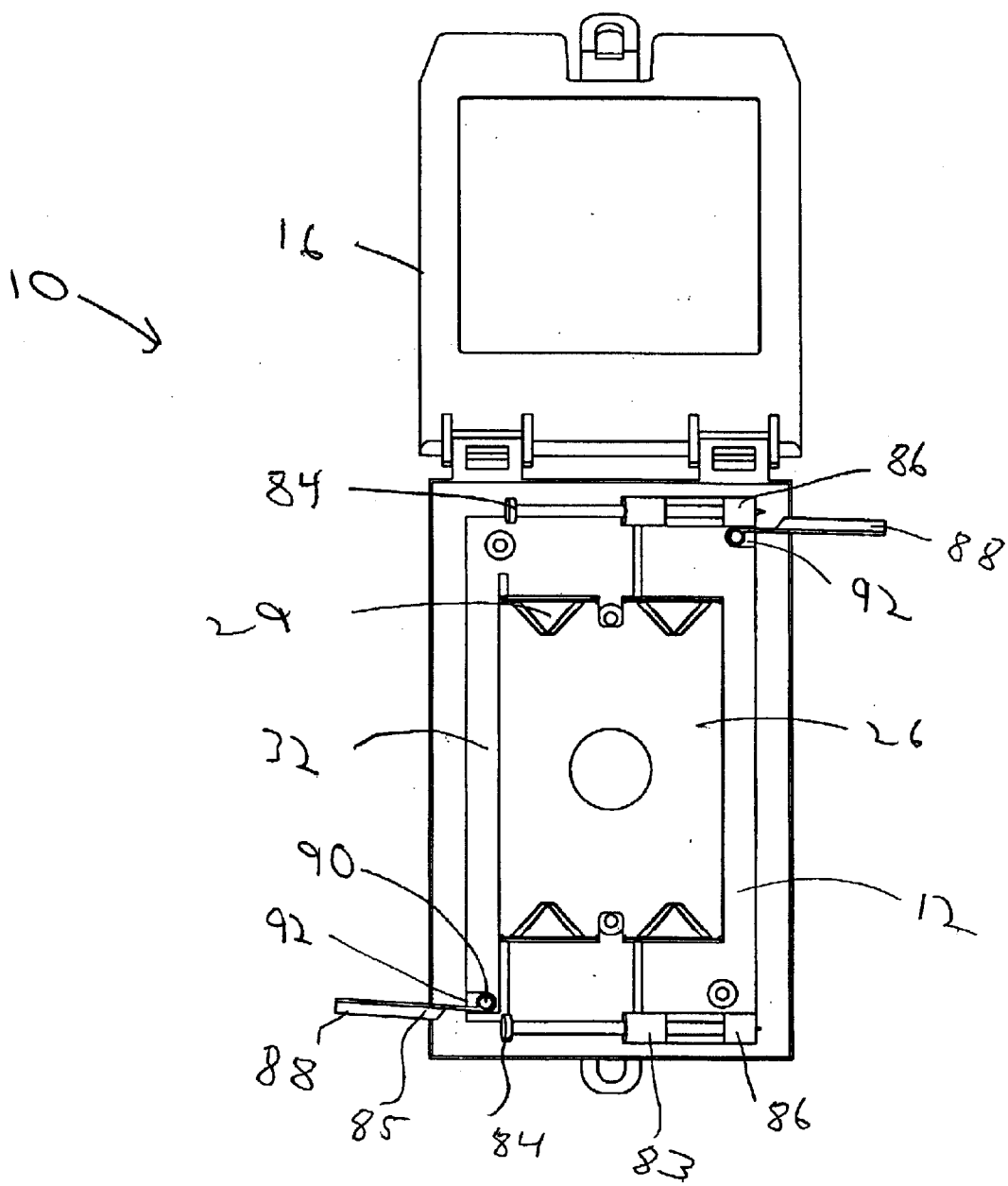
FIG. 7 is a back elevational view of the electrical box of the present invention showing the cover in the open position.
Figure 8:
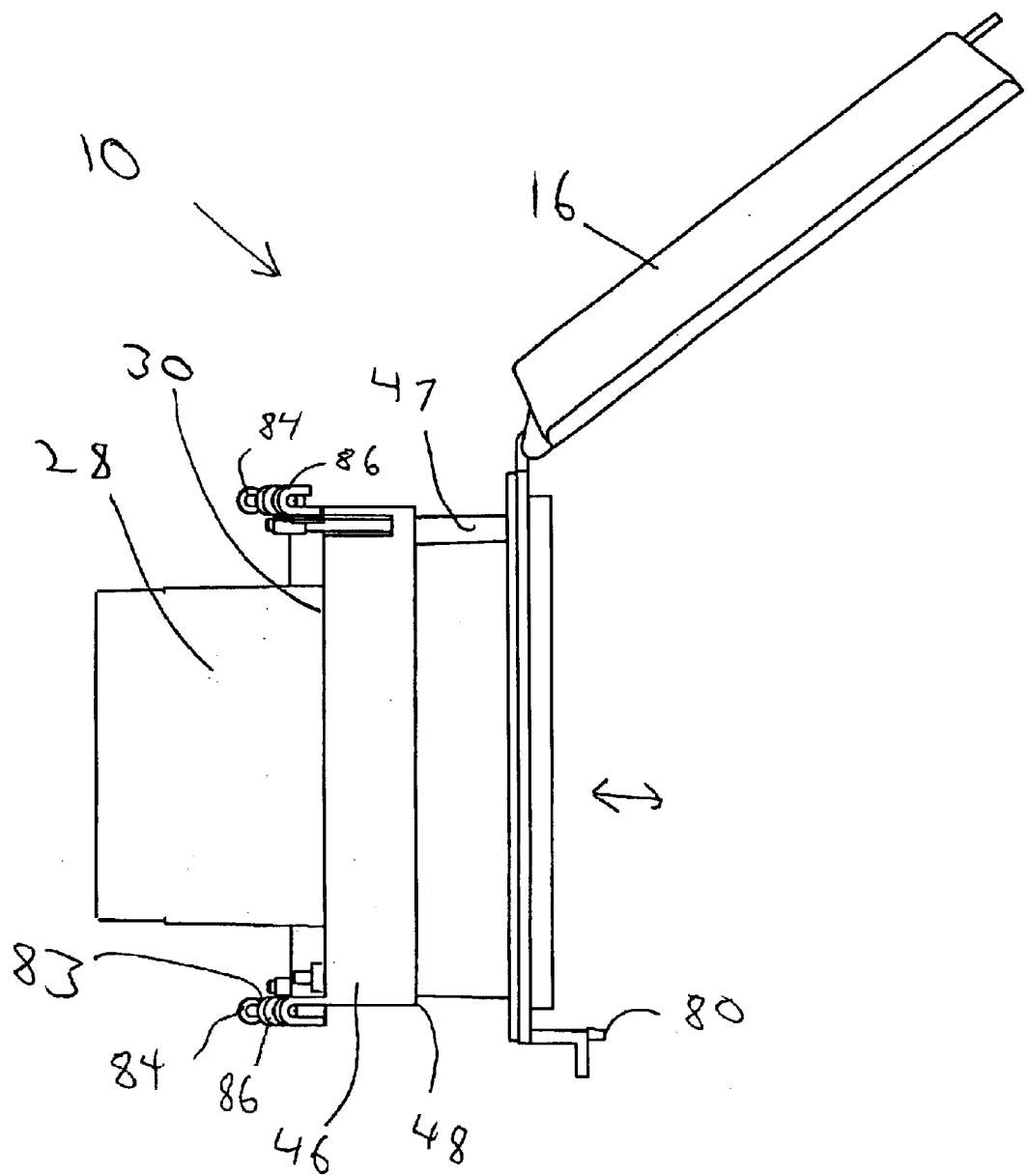
FIG. 8 is a side elevational view of the outlet box showing the cover in the open position.

The electrical box assembly 10 of the present invention may be installed in both new work and old work applications. In old work wall applications for example, the wall studs 87 are covered with a facing surface 24 such as wall board or plaster for interior walls and plywood and siding material for exterior applications. New work wall applications would generally include those in which the studs are exposed and access thereto is provided. In order to effect installation, outlet box 12 may include a securement device including a movable member for engaging a support structure such as a stub of facing surface and securing outlet box 12 thereto. For new work applications, outlet box 12 includes a first securement device 83 including a pair of fasteners, such as nails 84, each being held within a corresponding channel 86 disposed on opposing sides of electrical box 12 as shown in FIGS. 5, 7 and 8. The electrical box 12 may be placed against a stud 87 or other structural member and an installer would hammer nails 84 into the stud in order to secure it thereto. Once the facing surface 24 is attached, an installer would then place frame 14 within collar opening 50 and adjust the position of frame 14 until abutment surface 64 sits securely against the front side of facing surface 24 (FIG. 5).

Figure 9:
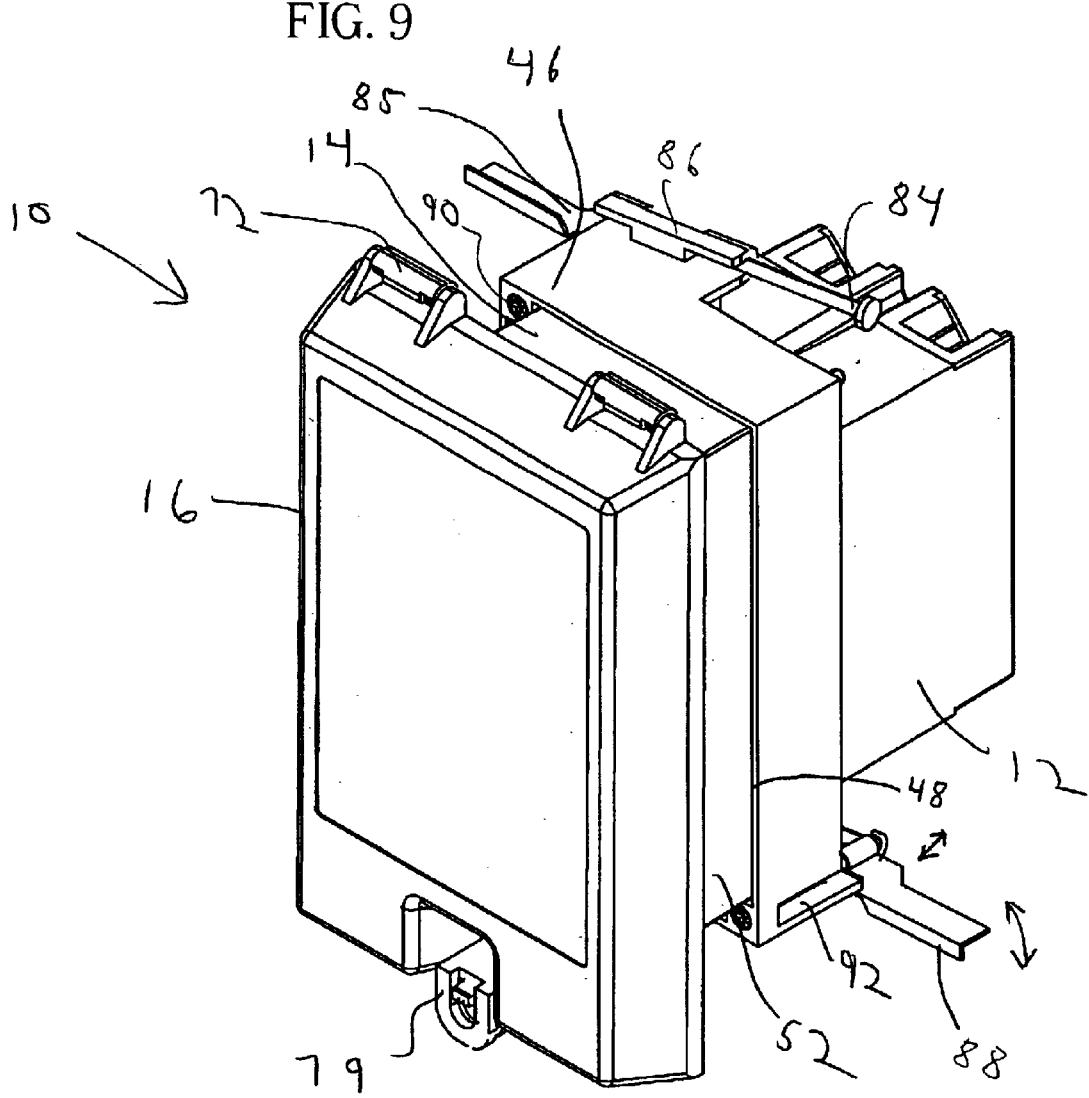
FIG. 9 is a top perspective view of the present invention showing the cover in the closed position.

In order to install electrical box assembly 10 in an old work application, electrical box 12 is inserted into an opening 89 formed in the facing material 24. With reference to FIGS. 6, 7 and 9, for old work applications outlet box 12 includes a second securement device 85 includes elongate members forming swing arms 88 which are pivotably secured to electrical box 12. Swing arms 88 are attached to threaded members 90 as shown in FIG. 2. Upon rotation of threaded members 90, swing arms 88 move from a closed position in which they substantially lie against the electrical box 12 to an open position where they extend outwardly from box 12. Continued rotation of threaded members causes swing arms 88 to translate forward closer to rim 48 of collar 46. Slots 92 are formed in the collar 46 to permit the translation of swing arms 88. Such a mechanism is well known in the art. When box 12 is placed within an opening in the wall, swing arms may be rotated such that they substantially align with the back face of flange 32. In this closed position, they do not interfere with the box being placed within an opening formed in the wall. Once in the proper position, threaded members 90 may be rotated moving the swing arms 88 toward the open extended position and further rotated such that the swing arms are moved forwardly and abut against the backside of the facing surface 24 of the wall. Swing arms 88 prevent the electrical box from pulling out from the wall. In order to prevent the box from moving into the hole formed in the wall, face flange 54 extending from frame 14 is configured to abut against the front of the facing surface 24, as shown in FIG. 5. Therefore, facing surface 24 is sandwiched between swing arms 88 and face flange 54. In the preferred embodiment, electrical box 12 includes both first and second securement devices 83 and 85 such that it can be employed in both new work and old work applications.

Figure 4:
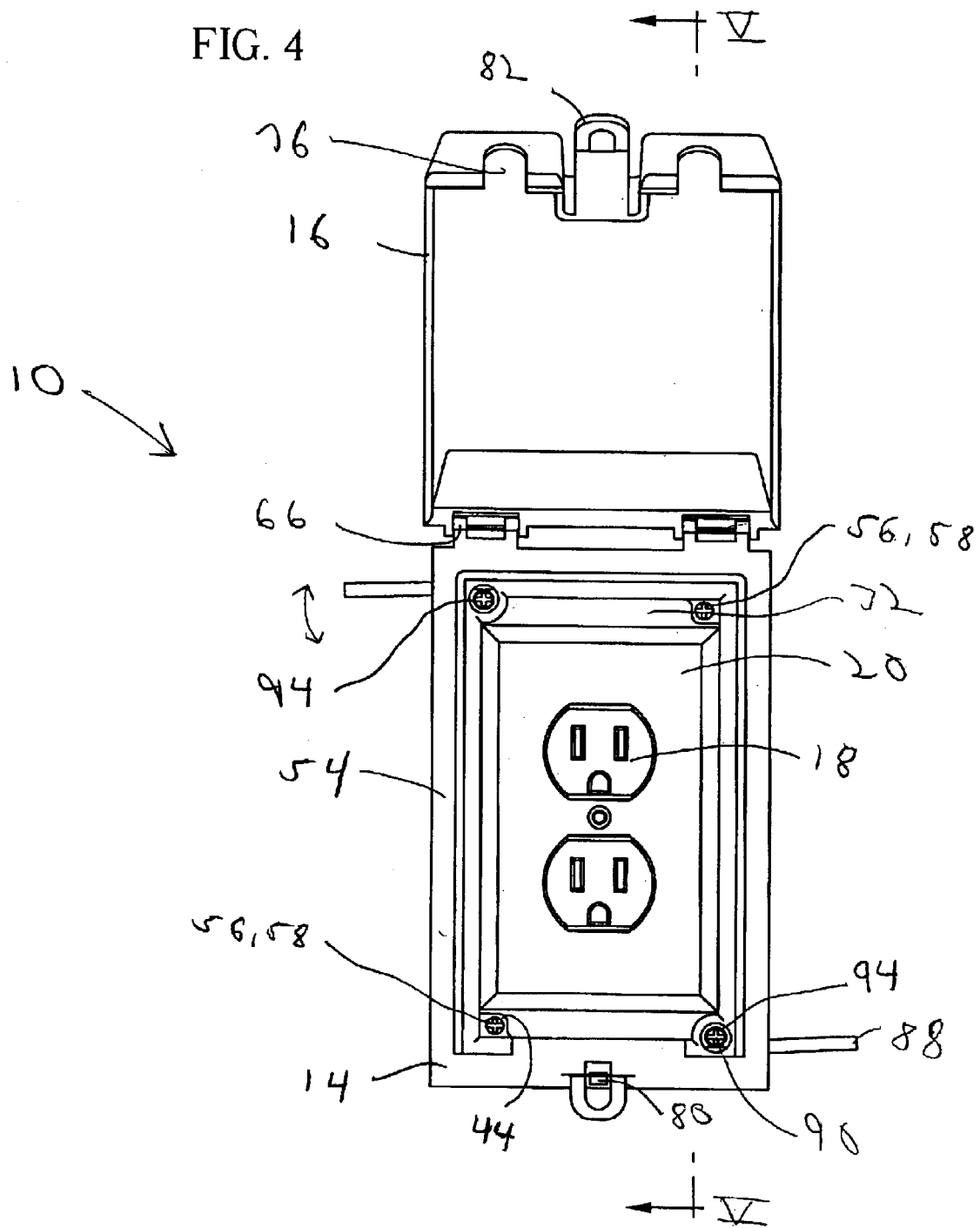
FIG. 4 is a front elevational view of the present invention of FIG. 1.

As shown in FIG. 4, when frame 14 is attached to box 12, access to threaded members 90 is permitted by way of openings 94 located in face flange 54. Accordingly, when a hole is formed in facing surface 24 and electrical box 12 and frame 14 are inserted into the hole, frame 14 prevents electrical box 12 from extending through the hole in the facing surface. An installer would then rotate the threaded members 90 in order to move swing arms 88 into engagement with the back side of the facing surface 24. Next an installer would rotate the threaded fasteners 58 of the adjustment device 56 in order to urge the face flange 54 against the front side of facing surface 24. It is within the contemplation of the present invention that other securement devices well known in the art could be employed to secure electrical box 12, such as clips, brackets, screws or protruding spikes.

Since the thickness of facing material 24 may vary depending on the application, and, in new work applications, the placement of the electrical box on the support member may vary, the present invention includes adjustability in order to permit the assembly to be properly secured. Such adjustability comes for the telescopic movement between frame 14 and box 12. By permitting a degree of movement between these two components, a tight seal between face flange 54 and the front surface of facing surface 24 can be achieved. Use of gasket 22 positioned between the face flange 54 and facing surface 24 creates a fluid-resistant seal. Accordingly, the present invention may be used in damp areas both in and out of doors.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electrical box assembly comprising:
 a box having a base wall perimetrically bounded by a sidewall extending therefrom forming a housing adapted to receive an electrical component, said sidewall having an upper portion and a flange extending outwardly in a transverse direction from said upper portion, an electrical component attachment point being disposed on said sidewall upper portion and adapted for securing an electrical component to said box, said flange being perimetrically bounded by a collar extending outwardly therefrom;

a securement device disposed on said box for securing said box to a support structure;

a frame being in telescopic engagement with said collar and movable relative thereto, said frame having an abutment surface for abutting against a facing surface, said frame being separate from said electrical component attachment point such that movement of said frame does not move said electrical attachment point; and an adjustment device for moving said frame relative to said box and urging said abutment surface against the facing surface.

2. The electrical box assembly as defined in claim 1, wherein said adjustment device extends between said frame and said box.

3. The electrical box assembly as defined in claim 2, wherein the adjustment device includes a pair of threaded members threaded engaged with said flange.

4. The electrical box assembly as defined in claim 1, wherein said frame includes a wall ending in a face flange extending outwardly from said wall, said wall being insertable within an opening formed by said collar.

5. The electrical box assembly as defined in claim 4, wherein said wall includes a plurality of wall segments joined together to form a continuous structure.

6. The electrical box assembly as defined in claim 5, wherein said wall segments form a generally rectangular wall and said collar has a corresponding rectangular shape.

7. The electrical box assembly as defined in claim 4, wherein said abutment surface is disposed on said face flange.

8. The electrical box assembly as defined in claim 1, further including a gasket disposed on said frame adjacent said abutment surface.

9. The electrical box assembly as defined in claim 1, further including a cover pivotally secured to said frame by a hinge, the cover being movable between an open and closed position.

10. The electrical box assembly as defined in claim 9, wherein said hinge includes at least one clip for permitting said cover to be selectively removed and attached to said frame.

11. The electrical box assembly as defined in claim 9, wherein said cover includes at least one slot formed therein being adapted to permit a power cord to extend there through when said cover is in said closed position.

12. The electrical box assembly as defined in claim 9, wherein said cover includes a latch for securing said cover in said closed position.

13. The electrical box assembly as defined in claim 1, wherein said securement device includes a fastener movably secured to said box said fastener being adapted for engagement with a support structure.

14. The electrical box assembly as defined in claim 1, wherein the securement device includes a swing arm pivotally secured to said box and translatable with respect to said box.

15. The electrical box assembly as defined in claim 14, wherein the securement device includes a fastener movably secured to said box said fastener being adapted for engagement with a support structure.

16. The electrical box assembly as defined in claim 1, wherein said telescopic engagement between said frame and said collar permits relative translation and generally restricts relative rotation.

17. The electrical box assembly as defined in claim 1, wherein said frame is secureable to said electrical box independent of said electrical component attachment point.

18. A recessed electrical box assembly comprising:

a box having a base wall bounded by a sidewall extending therefrom forming a housing, said sidewall having an upper end forming a first opening;

a flange extending outwardly in a transverse direction from said box upper end portion, said flange being bounded by a collar extending outwardly therefrom, said collar forming a second opening, said second opening being larger than said first opening;

a frame having a second sidewall forming a third opening, said second sidewall being adjustably positionable within said second opening;

an adjustment device for moving said frame relative to said box, said adjustment member extending between said frame and said flange.

19. The electrical box assembly as defined in claim 18, wherein said adjustment device includes a first and second threaded members extending through a pair of apertures in said frame, said first and second threaded members threadedly engaging a pair of threaded openings disposed on said flange, wherein rotation of said first and second members moves said frame relative to said box.

20. The electrical box assembly as defined in claim 18, wherein said collar is in sliding relationship with said frame second wall.

21. The electrical box assembly as defined in claim 20, wherein said collar prevents rotation of said second sidewall relative to said box.

22. The electrical box assembly as defined in claim 18, further including a cover pivotally secured to said frame and movable between an open and closed position.

23. The electrical box assembly as defined in claim 18, wherein said box includes at least one electrical component attachment point fixed on said box sidewall for securing an electrical component to said box.

24. An electrical box assembly comprising:

a box having a base wall bounded by a sidewall extending therefrom forming a housing adapted to receive an electrical component, said sidewall having an upper portion and a flange extending outwardly in a transverse direction from said upper portion, an electrical component attachment point being disposed on said sidewall upper portion and adapted for securing an electrical component to said box, said flange being bounded by a collar extending outwardly therefrom;

a securement device disposed on said box having a movable member which is engagable with a support structure;

a frame being in telescopic engagement with said collar and movable relative thereto, said frame having an abutment surface for abutting against a facing surface, said frame being separate from said electrical component attachment point such that movement of said frame does not move said electrical attachment point; and an adjustment device including a member extending between said frame and said box which is movable to translate said frame relative to said box and urging said abutment surface against the facing surface.

25. The electrical box assembly as defined in claim 24, wherein said frame includes a wall having a first end having face flange extending outwardly from said wall, said wall being insertable within an opening formed by said collar.

26. The electrical box assembly as defined in claim 24, wherein said face flange extends outwardly beyond said collar when said frame is engaged with said collar.

27. The electrical box assembly as defined in claim 24, wherein said frame is secureable to said electrical box independent of said electrical component attachment point.

28. The electrical box assembly as defined in claim 25, wherein said frame wall includes a second end opposite said first end and defines an opening to permit access to the electrical component.

* * * * *